United States Patent Office 3,405,144
Patented Oct. 8, 1968

3,405,144
1-AZIDO-N,N,N'-TRIFLUOROFORMAMIDINE
Thomas H. Brownlee, Stamford, Conn., assignor to American Cyanamid Company, Stamford, Conn., a corporation of Maine
No Drawing. Filed May 16, 1966, Ser. No. 551,191
1 Claim. (Cl. 260—349)

ABSTRACT OF THE DISCLOSURE

This invention relates to trifluoroguanyl azide. More particularly, this invention relates to trifluoroguanyl azide and a method for the production thereof. Still more particularly, this invention relates to propellant compositions containing trifluoroguanyl azide.

According to the instant invention, trifluoroguanyl azide is prepared by reacting perfluoroformamidine with an alkali metal azide according to the equation;

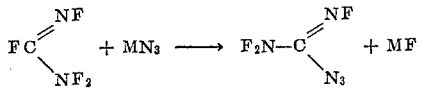

wherein M is an alkali metal.

The process can be conducted utilizing either equimolar amounts of the formamidine and alkali metal azide or an excess of either reactant without detracting from the feasibility of the reaction. Temperatures ranging from about −200° C. to about 50° C. may be employed, the reaction being conducted at atmospheric pressure or below. The reaction is allowed to proceed for from about 30 minutes to about 7 days and the resultant product is recovered by fractional codistillation.

As mentioned above, any alkali metal azide may be used herein. Examples of such azides include lithium azide, sodium azide, potassium azide, rubidium azide, cesium azide and the like.

Perfluoroformamidine is a known compound and is produced, among other methods, by reacting biguanide with fluorine gas in a fluid bed reactor under conditions more fully described in copending application Ser. No. 195,023, filed May 11, 1962.

The following examples are set forth for purposes of illustration only and are not to be construed as limiting the instant invention except as set forth in the appended claims. All parts and percentages are by weight unless otherwise specified.

Example 1

.023 part of perfluoroformamidine is condensed at −196° C. into a suitable reaction vessel containing 0.2 part of sodium azide. The vessel is slowly warmed to 25° C. and the reaction media is allowed to remain at that temperature for 5 days. The resulting mixture is then fractionally codistilled after removal of nitrogen gas by pumping at −196° C. 65% of trifluoroguanyl azide is recovered. The properties of the trifluoroguanyl azide are as follows:

Appearance: colorless liquid
Boiling point: 35° C. ±5° C.
UV absorption: $\epsilon_{230\ m\mu} = 3750$ Following the procedure of Example 1, various other alkali metal azides are reacted with perfluoroformamidine to produce trifluoroguanyl azide. The results are set forth in Table I, below.

TABLE I

| Example | Alkali metal azide | Temp., °C. | Time, (day) | Yield of TGA,[1] (percent) |
|---|---|---|---|---|
| 2 | KN$_3$ | −196–25 | 1 | 45 |
| 3 | CsN$_3$ | −196–25 | [2] 3 | 5 |
| 4 | LiN$_3$ | −196–25 | 3 | 47 |
| 5 | RbN$_3$ | −196–25 | 7 | 58 |

TGA = Trifluoroguanyl azide.
[1] Hours.

The trifluoroguanyl azide produced herein possesses properties which make it highly useful as a component in rocket fuel compositions. For example, it has a high nitrogen and fluorine content thereby resulting, when mixed with various other fuel components etc., in a propellant of high specific impulse. Furthermore, it is stable in air and shows no measurable impact or electrical sensitivity.

The trifluoroguanyl azide can be employed as an ingredient in propellant compositions in accordance with general procedures well known to those skilled in the art. For example, one may add such fuels as aluminum, beryllium, boron and the like to the propellant compositions containing the trifluoroguanyl azide claimed herein.

I claim:
1. The compound 1-azido-N,N,N'-trifluoroformamidine.

References Cited
UNITED STATES PATENTS 3,228,936  1/1966  Davis et al. _____ 260—564
3,215,709 11/1965  Logothetis _____ 260—349

OTHER REFERENCES

Roberts, et al.: Basic Principles of Org. Chem. (Benjamin, N.Y., 1964), page 696.
Mitsch: J. Am. Chem. Soc., vol. 87, pp. 328 to 333 (1965).

HENRY R. JILES, Primary Examiner.
C. SHURKO, Assistant Examiner.

UNITED STATES PATENT OFFICE
CERTIFICATE OF CORRECTION

Patent No. 3,405,144　　　　　　　　　　　　　　　　　　　October 8, 1968

Thomas H. Brownlee

It is certified that error appears in the above identified patent and that said Letters Patent are hereby corrected as shown below:

Column 2, footnote to TABLE I, line 1 thereof, "TGA=Trifluoroguanyl azide" should read -- $^1$TGA=Trifluoroguanyl --; line 2, "$^1$Hours" should read -- $^2$Hours --.

Signed and sealed this 3rd day of March 1970.

(SEAL)
Attest:

Edward M. Fletcher, Jr.　　　　　　　　　　　　WILLIAM E. SCHUYLER, JR
Attesting Officer　　　　　　　　　　　　　　　　Commissioner of Patents